(12) United States Patent
Radivojevic et al.

(10) Patent No.: US 8,519,950 B2
(45) Date of Patent: Aug. 27, 2013

(54) INPUT DEVICE

(75) Inventors: Zoran Radivojevic, Cambridge (GB);
Jarkko Tapio Saunamaki, Vantaa (FI);
Teuvo Tapani Ryhanen, Helsinki (FI);
Stephanie P. Lacour, Willingham (GB)

(73) Assignee: Nokia Corporation, Espoo (FI)

( * ) Notice: Subject to any disclaimer, the term of this patent is extended or adjusted under 35 U.S.C. 154(b) by 666 days.

(21) Appl. No.: 12/743,716

(22) PCT Filed: Nov. 19, 2007

(86) PCT No.: PCT/EP2007/062525
§ 371 (c)(1),
(2), (4) Date: May 19, 2010

(87) PCT Pub. No.: WO2009/065436
PCT Pub. Date: May 28, 2009

(65) Prior Publication Data
US 2010/0259472 A1    Oct. 14, 2010

(51) Int. Cl.
*G09G 5/00* (2006.01)

(52) U.S. Cl.
USPC ........... 345/156; 345/204; 345/206; 345/208; 345/209; 345/212

(58) Field of Classification Search
USPC ................. 345/156–173, 204–212, 698, 699; 341/20; 703/5; 715/863
See application file for complete search history.

(56) References Cited

U.S. PATENT DOCUMENTS

| | | | |
|---|---|---|---|
| 5,184,319 A * | 2/1993 | Kramer | 703/5 |
| 6,701,296 B1 | 3/2004 | Kramer et al. | |
| 6,809,723 B2 * | 10/2004 | Davis | 345/166 |
| 6,848,083 B2 * | 1/2005 | Shen | 715/863 |
| 7,042,438 B2 * | 5/2006 | McRae et al. | 345/156 |
| 7,084,884 B1 | 8/2006 | Nelson et al. | |
| 8,132,468 B2 * | 3/2012 | Radivojevic | 73/777 |
| 2002/0075232 A1 | 6/2002 | Daum et al. | |
| 2002/0167489 A1 * | 11/2002 | Davis | 345/157 |
| 2003/0011562 A1 * | 1/2003 | Shen | 345/156 |
| 2004/0174337 A1 | 9/2004 | Kubota et al. | |

(Continued)

FOREIGN PATENT DOCUMENTS

JP    2004213350    7/2004

OTHER PUBLICATIONS

Office Action dated May 24, 2012 for corresponding Chinese Application No. 200780101610.9, 3 pages.

(Continued)

*Primary Examiner* — Prabodh M Dharia
(74) *Attorney, Agent, or Firm* — Hollingsworth Davis, LLC (57) ABSTRACT

An input device for a user interface comprises means to monitor movement of a user by mapping and recording deformations of their skin. The input device comprises conformable/reversibly stretchable material for placement onto the skin of a user. A plurality of sensors are mounted on, or embedded in, the stretchable material and arranged to undergo, and track in-plane and out-of-plane deformations corresponding to stretching and flexure of the underlying skin. A signal for controlling another device is then generated, based on the detected movement, gesture or positioning of the user based on the detected deformations. In wearable electronics applications, the other device may be mounted on the same stretchable material. The sensors may be arranged to provide active feedback, by selectively applying vibrations or pressure to the user's skin.

19 Claims, 9 Drawing Sheets

(56) References Cited

U.S. PATENT DOCUMENTS

| | | | |
|---|---|---|---|
| 2004/0254771 A1* | 12/2004 | Riener et al. | 703/7 |
| 2005/0052412 A1* | 3/2005 | McRae et al. | 345/158 |
| 2005/0078124 A1* | 4/2005 | Liu et al. | 345/629 |
| 2007/0262958 A1* | 11/2007 | Cai et al. | 345/158 |
| 2007/0290988 A1* | 12/2007 | Nogami et al. | 345/156 |
| 2008/0136679 A1* | 6/2008 | Newman et al. | 341/20 |
| 2009/0293631 A1* | 12/2009 | Radivojevic | 73/774 |
| 2009/0326833 A1* | 12/2009 | Ryhanen et al. | 702/33 |

OTHER PUBLICATIONS

Office Action received in corresponding Korean Application No. 2010-7013330, Dated Dec. 6, 2011, 12 pages.

International Search Report and Written Opinion of the International Searching Authority from PCT/EP2007/062525 dated Jul. 31, 2008, pp. 1-19.

Lacour, et al., "Stretchable Interconnects for Elastic Electronic Surfaces", IEEE, vol. 93, No. 8, Aug. 2005, pp. 1459-1467.

Lacour et al., "Mechatronic System of Dielectric Elastomer Actuators Addressed by Thin Film Photoconductors on Plastic", Sensors and Actuators, A, 111 (2004) pp. 288-292.

Lacour et al., "Stiff Subcircuit Islands of Diamondlike Carbon for Stretchable Electronics", Journal of Applied Physics, 100, 014913 (2006), pp. 1-6.

Vesselin et al., "An Initial Investigation of Structural Nanoskin Based on Carbon Nanosphere Chains", Apr. 3, 2007, pp. 1-20.

Panipol Oy, "Panipol—Conductive Polymers" Sep. 5, 2008, www.panipol.fi.

Lacour et al., "Thin Film Transistor Circuits Integrated onto Elastomeric Substrates for Elastically Stretchable Electronics", IEEE, 2005, pp. 1-4.

Office Action received in corresponding Chinese Application No. 2007801016109, Dated Nov. 16, 2011, 14 pages.

The Canadian Office Action dated Feb. 8, 2013 from Canadian Application No. 2701963, 3 pages.

\* cited by examiner

INPUT DEVICE

RELATED APPLICATION

This application was originally filed as PCT Application No. PCT/EP2007/062525 filed Nov. 19, 2007.

The invention relates to an input device for a user interface. In particular, the invention relates to an input device arranged to monitor movement of a user by mapping and recording deformations of their skin.

Conventional user interfaces often include a set of electro-mechanical switches located on the electronic device to be controlled, such as the text keyboard on a laptop computer, a numerical keypad on a mobile telephone and so on. However, this approach may require a considerable number of dedicated switches in order to provide sufficiently flexible user interaction. Portable devices, such as handheld gaming devices, laptop computers, near-eye portable displays (NED), mobile telephones, personal multimedia players, personal digital assistants and so on, are subject to size limitations and/or the need to maximise the size of other user interface components, such as display screens. The need to provide dedicated switches may conflict with the miniaturisation of such devices. For instance, in the case of near-eye displays, there are limitations on the type of user interaction solutions that can be provided because of space constraints and the fragility of the overall system, which may be disturbed when touched by the user.

One alternative approach is the provision of a separate input device, such a mouse or remote control. Recently, there has been a great deal of interest in the provision of separate input devices that can be worn by a user and controlled by movement or gestures. For instance, some prior art input devices have taken the form of gloves equipped with a variety of discrete sensors for monitoring the position, posture and/or motion of the user's hands. In particular, a number of devices have been provided with strain gauges for monitoring flexure of a user's finger joints. The use of such input devices can permit a more natural and intuitive interaction between the user and the device. Such considerations may be particularly important in gaming, virtual reality or wearable electronics applications.

According to the present invention, an apparatus comprises conformable material arranged to, when placed adjacent to a user's skin, undergo deformation conforming to deformation of the skin and a plurality of sensors arranged to provide respective outputs corresponding to movement of said sensors with respect to one another in response to said deformation of the conformable material.

The term "conformable material" is intended to indicate an elastic material capable of undergoing stretching and contraction to a degree sufficient for detecting deformation of the underlying user's skin.

The sensors may be arranged in an array on, or in, the conformable material. For instance, the sensors may be provided in an arrangement that extends over two dimensions.

The sensors may comprise sensing material configured to respond to deformation by generating an electrical charge and a controller may be connected to said sensors by conductors and arranged to monitor charges generated by said sensing material.

The sensors comprise sensing material that responds to deformation by altering an electrical property thereof, such as electrical resistance or capacitance, and said apparatus comprises a controller connected to said sensors by conductors and arranged to monitor changes in said electrical property.

Said conductors may have a non-linear shape.

The conductors may comprise a first set of conductors, connected at respective first surfaces of the sensing material of said sensors, and a second set of conductors, connected at respective second surfaces of said sensing material and said controller is arranged to address individual ones of said sensors using selected ones of said first set of conductors and said second set of conductors.

The conformable material may comprise a conformable substrate, said sensing material being mounted on said substrate and said conductors being connected to the sensing material of said sensors at respective first surfaces thereof. Alternatively, said sensing material may be embedded in said substrate and said conductors are connected to the sensing material of said sensors at respective first surfaces thereof.

In some embodiments, at least one of said sensors may comprise a layer of said sensing material, where the controller is connected to said at least one sensor by four of said conductors, a first and second of said conductors are connected to a first surface of said layer and a third and fourth of said conductors are connected to a second surface of said layer opposite to said first surface, said controller being arranged to obtain readings from said sensor opposite surfaces of said layer and arranged to perform said monitoring by taking readings using multiple pairs of conductors selected from said first, second, third and fourth conductors.

The apparatus may comprise active feedback elements arranged to exert pressure on said skin in response to said outputs or external wireless inputs. The sensors may themselves act as the active feedback elements. Said pressure may be exerted repeatedly, in the form of a vibration.

The apparatus may comprise a processor arranged to generate a signal to control a device according to said outputs. Said signal may be based on one or more time derivatives of said outputs. Alternatively, the apparatus may be arranged to transmit said outputs to said device directly.

By conforming to, and tracking, deformations of a user's skin, the apparatus may provide a versatile and precise user interface that can be controlled using a large number of gestures and/or subtle movements of limbs or digits. If required, the apparatus may be arranged to generate an output signal that varies according to the degree of flexing of a joint and/or stretching of the skin, and/or to the speed with which a gesture is made, facilitating the fine control of a device.

The apparatus may be arranged to provide control of equipment such as a phone, a multimedia device or a gaming device through movement of joints, for example, a user's wrist, knuckle, neck, knee, elbow, toe or ankle, or to track the movement of a limb or digit of the user.

Such apparatus may be particularly suitable for gaming and virtual reality applications, lightweight wearable electronic devices, near-eye displays or miniaturised functional electronics units mounted on, or integrated with, the input device. Such devices can provide remote guidance, steering a mouse pointer on external screens, browsing digital content at external device and so on, in a highly intuitive manner, without requiring a high degree of cognitive effort on the part of the user. The use of conformable material may result in the apparatus being comfortable to use and/or wear.

The apparatus may be arranged to receive an indication of an association between a control signal and a predetermined set of outputs and to respond to outputs of the sensors meeting requirements of said predetermined set by generating the associated control signal. Alternatively, the apparatus may be arranged to receive an indication of an association between a control signal and a predetermined set of time derivatives of said outputs and to respond to time derivatives of the outputs of the sensors meeting requirements of said predetermined set by generating the associated control signal. In either of these manners, a user may be permitted to customise the control signals generated in response to particular movements or gestures.

This aspect also provides a system comprising at least one of said apparatuses and the device controlled thereby.

In such a system, the device may be arranged to determine a reconstruction of a movement of the user according to said outputs, to track movements of part of a body of the user according to the outputs of said sensors and, if required, to copy said movements.

The device may be arranged to display content and said apparatus may be arranged to control browsing of said content.

The device may be arranged to display an image. If required, the device may be arranged to update said image periodically to correspond with said outputs and/or to superimpose an indicator of the outputs onto said image.

The device may be a computer, near-eye display, mobile telephone, telephone headset.

The device may itself be provided on the conformable material of the apparatus.

For example, the device may be mounted on, or embedded in, the conformable material. Such a device may be a personal audio player, wristwatch, GPS monitor and so on.

This aspect also provide a method comprising providing a plurality of sensors integrated on a conformable material, the sensors being arranged to provide respective outputs corresponding to movement of said sensors with respect to one another and monitoring deformation of the conformable material, said deformations conforming to deformation of a user's skin to which the conformable material is adjacent, using said sensors.

The method may comprise placing the conformable material onto the skin of the user. For instance, the material may be placed over a joint of the user.

According to a second aspect of the invention, a system comprises a near eye display arranged to display an image and an input device comprising conformable material arranged to, when placed adjacent to a user's skin, undergo deformation conforming to deformation of the skin, a plurality of sensors arranged to provide respective outputs corresponding to movement of said sensors with respect to one another in response to said deformation of the conformable material, a processor arranged to generate a signal to control the display of the image by said near eye display according to said outputs and a transmitter arranged to transmit the signal to the near eye display.

The image may include a cursor and the processor may be arranged to generate said signal to control the position of said cursor within said image.

The image may comprise visual content and the input device may be arranged to control browsing of said content.

According to a third aspect of the invention, a system comprises a computing device arranged to generate an image for display and at least one input device comprising conformable material arranged to, when placed adjacent to a user's skin, undergo deformation conforming to deformation of the skin, a plurality of sensors arranged to provide respective outputs corresponding to movement of said sensors with respect to one another in response to said deformation of the conformable material, a processor arranged to generate a signal to control the display of said image according to said outputs and a transmitter arranged to transmit the signal to the computing device.

The image may include a cursor and the processor may be arranged to generate said signal to control the position of said cursor within said image.

The image may comprise visual content and the apparatus may be arranged to control browsing of said content.

According to a fourth aspect of the invention, a system comprises a mobile telephone and an input device comprising conformable material arranged to, when placed adjacent to a user's skin, undergo deformation conforming to deformation of the skin, a plurality of sensors arranged to provide respective outputs corresponding to movement of said sensors with respect to one another in response to said deformation of the conformable material, a processor arranged to generate a signal to control said mobile telephone according to said outputs and a transmitter arranged to transmit the signal to the mobile telephone.

The input device may be arranged to generate signals to accept and reject incoming telephone calls in accordance with said outputs.

Embodiments of the invention will now be described, by way of example, with reference to the accompanying drawings, of which:

FIG. 2 is a plan view of the network of sensors in the input device of FIG. 1a;

FIG. 3 is a perspective view of a network of sensors and a readout architecture of the input device of FIG. 1a;

FIG. 4 is a cross-sectional view of part of the input device of FIG. 1a;

FIG. 5 is a block diagram of the input device of FIG. 1a;

Figure 1A:
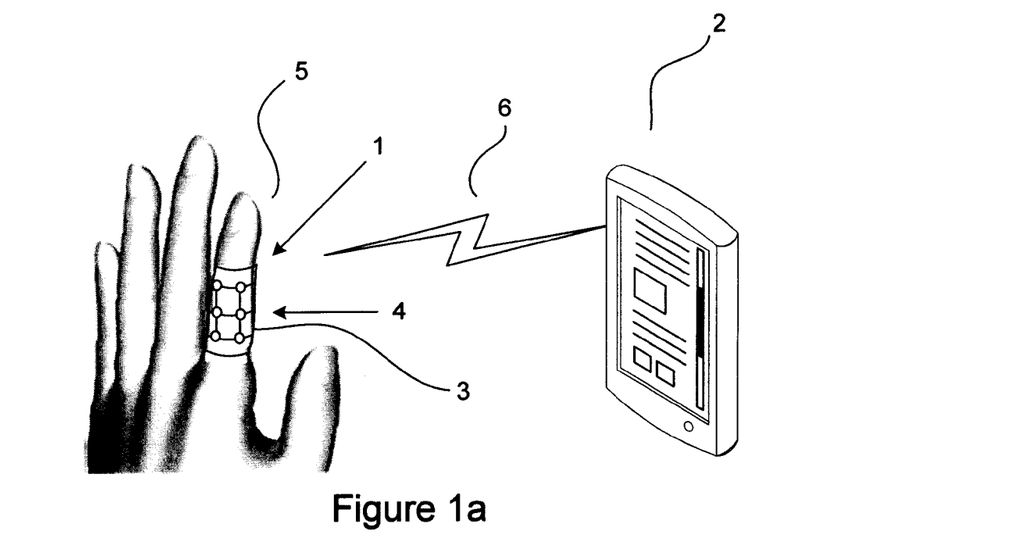
FIG. 1a depicts an input device according to a first embodiment of the invention when in a first position, when controlling an external device.
Figure 1B:
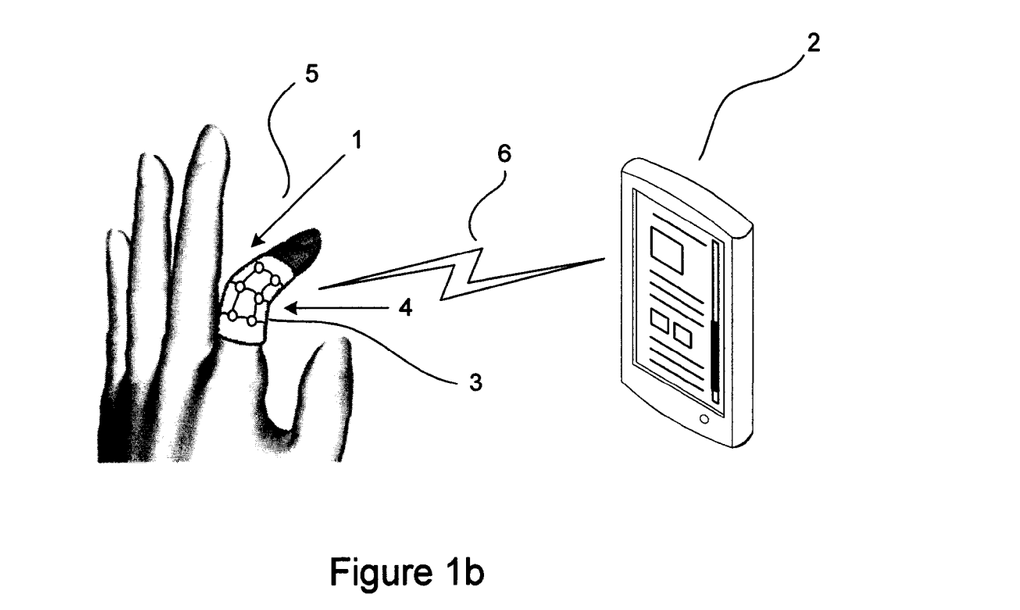
FIG. 1b depicts the input device of FIG. 1a in a second position.

FIGS. 1a and 1b depict an input device 1 according to a first embodiment of the invention for controlling an external device 2. In this particular example, the external device 2 is a personal digital assistant or tablet PC type device.

The input device 1 comprises a sleeve 3, configured to fit over a joint 4 in a user's index finger 5.

The sleeve 3 is arranged to conform to the user's skin and to undergo resilient deformation according to stretching and relaxation of the user's skin. In this particular example, the sleeve 3 is formed of a soft, conformable material, such as natural rubber, silicone, another elastomer or elastomer-like material that encapsulates the electrical components of the input device 1. In some embodiments of the invention, the sleeve 3 may be formed of a sensing composite rubber or elastomer doped with electrically conducting particles, piezoelectric particles or similar particles.

FIG. 1a depicts the input device 1 when the finger 5 is in a first, unbent, position. An output signal corresponding to the position of the finger is transmitted from the input device 1 to the external device 2 via a wireless communication link 6.

Examples of suitable wireless communication links include Bluetooth™ connections, Wibree links and so on.

FIG. 1b depicts the input device 1 of FIG. 1a when the user's finger 5 is in a second, bent, position and the transmission of a corresponding output signal from the input device 1 to the external device 2 via the wireless communication link 6.

Figure 2:
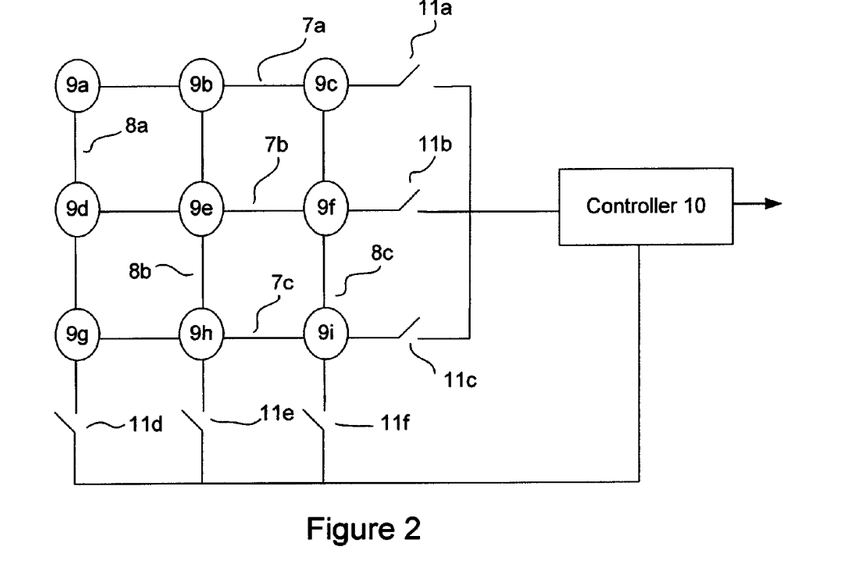
Figure 3:
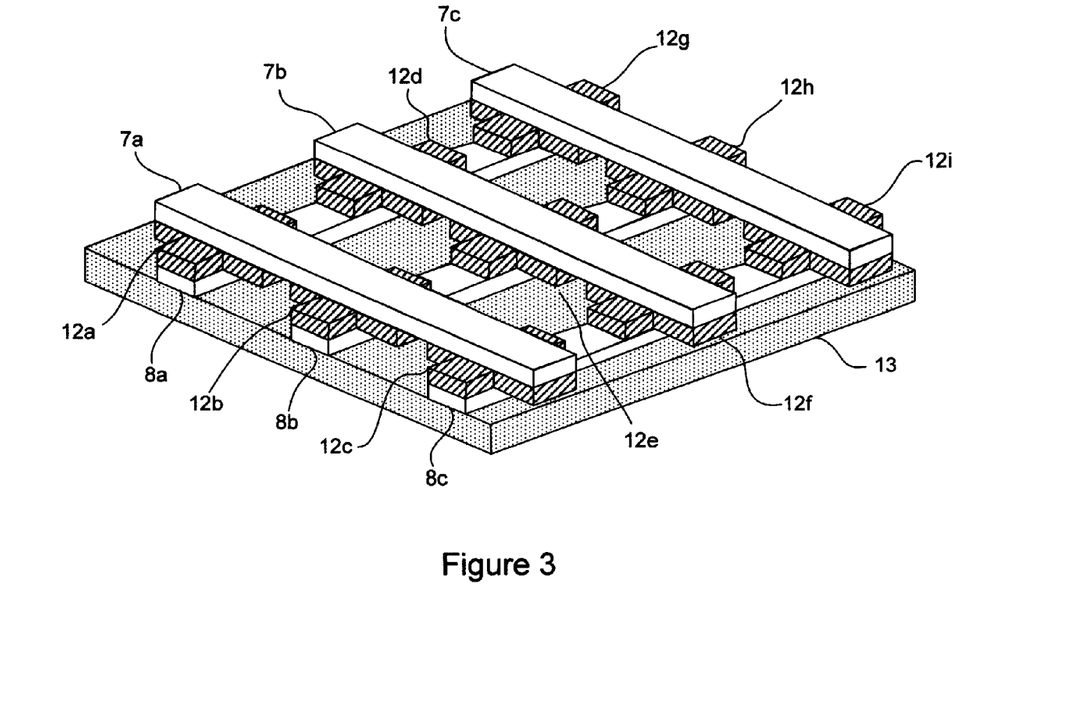
Figure 4:
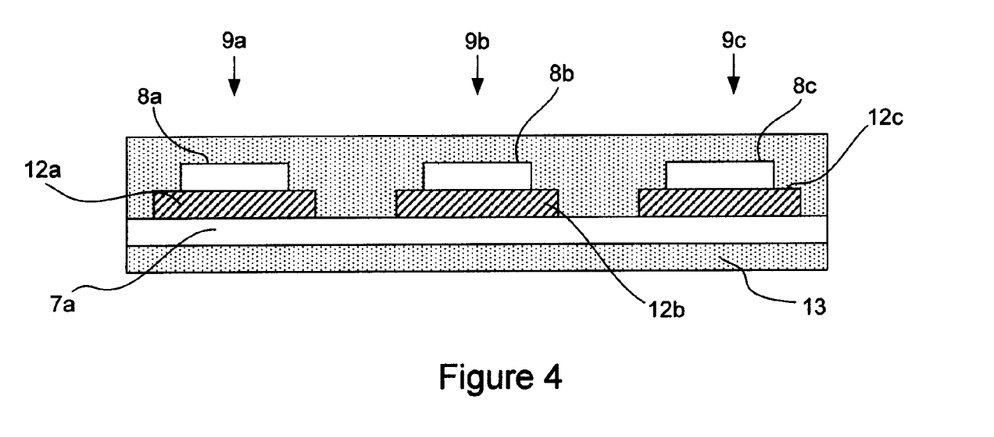

As shown in FIGS. 2, 3 and 4, the input device 1 comprises a plurality of elastic conductors 7a-7c extending along a first direction and a second plurality of elastic conductors 8a-8c extending along a second direction. The conductors 7a-7c, 8a-8c are formed on or embedded in the sleeve 3, and connect a plurality of sensors, or detection modules, 9a-9i to provide a readout architecture for the network of detection modules.

In this particular embodiment, the conductors 7a-7c, 8a-8c extend along straight lines to connect the sensing and processing elements of the input device 1. However, in other embodiments of the invention, the conductors 7a-7c, 8a-8c may take other forms. For instance, the conductors 7a-7c, 8a-8c may be curved, in a spiral form or similar manner to a spring for example, or have a zig-zag form to accommodate the placement of the sensing and processing elements and in accordance with the desired sensitivity of the overall system. The conductors 7a-7c, 8a-8c may be thin metallic films, that is, films having a sub-micrometer thickness, of gold, silver or copper. Such films may, if required, include micro-cracks in order to increase their elasticity. Alternatively, the conductors 7a-7c, 8a-8c may be formed of a conductive composite elastic layer in which conductive particles are embedded in an elastic polymeric matrix. The embedded particles may be micro-sized metallic particles, nano-sized carbon fullerenes ("bucky balls"), carbon nano-fibres, or microscopic metallic fibres or metal covered fibre networks. Such elastic composites or thin films on elastomers may be elongated, reversibly, by up to 50% in two dimensions simultaneously, while remaining electrically conductive. Such a level of reversible stretchability permits sensing of deformation of the user's skin.

In this particular example, the input device 1 comprises nine detection modules 9a-9i in the form of a 3×3 array. However, in other embodiments of the invention, more or fewer detection modules 9a-9i may be provided and arranged in other manners. The conductors 7a-7c, 8a-8c are connected to a controller 10 and are used for addressing and reading out from the individual detection modules 9a-9i using switches 11a-11f.

Each detection module 9a-9i comprises a sensing element 12a-12i of a sensing material in which an electrical property, such as charge generation, resistance or capacitance, changes in response to in-plane and out-of-plane deformations, that is, when stretched and/or flexed. Depending on the type of sensing element 12a-12i employed, the detection modules 9a-9i may detect flexure and/or two-dimensional stretching, or a combination of the two, for example, through the monitoring of one or more of localised charges, that is, voltages, generated by the sensing elements 12a-12i in response to stretching and/or flexure, resistance changes, where the sensing elements 12a-12i are formed of flexure sensitive piezoelectric, electrostrictive, ferroelectric or similar materials or are simple elongation sensitive resistors, and, where the sensing elements 12a-12i are configured to change their capacitance in response to stretching and/or flexure, localised capacitance changes of the sensing elements 12a-12i. These sensing techniques may be used and, if required, combined, in order to monitor complex skin deformations in three dimensions and, if required, to provide high resolution mapping thereof.

Suitable materials for forming the sensing elements 12a-12i include thin metal electrodes, or a piezoelectric ceramic material such as lead-zirconate-titanate (PZT), polyvinylidene fluoride (PVDF), elastomers and/or elastomeric composites having appropriate sensing properties and suitable nano-structured inorganic materials, such highly aligned zinc oxide (ZnO) nanomaterials. The detection modules 9a-9i, conductors 7a-7c, 8a-8c and, optionally, the controller 10, are covered by the elastic encapsulation material 13 forming the sleeve 3.

In embodiments where encapsulation material 13 forming the sleeve 3 is a doped composite rubber or elastomer, some or all of the sensing elements 12a-12i may be portions of the sleeve 3, rather than separate elements.

As the finger 5 of the user is flexed around the joint 4, the sensing elements 12a-12i of the detection modules 9a-9i undergo corresponding complex deformation which can be monitored and mapped. In this particular example, the controller 10 is arranged to monitor charges generated by the sensing elements 12a-12i. The controller 10 obtains a reading of the required localised voltage, through the conductors 7a-7c, 8a-8c, at a certain sampling frequency. The conductors 7a-7c, 8a-8c are used to address and obtain a reading from individual ones of the detection modules 9a-9i. For instance, the controller 10 can obtain a reading of the charge generated by sensing element 12a by measuring the voltage between conductors 7a and 8a, by operating switches 11a to 11f accordingly, while the charge generated by sensing element 12b can be determined by measuring the voltage between conductors 7a and 8b, and so on.

The sampling frequency is chosen in accordance with a required mapping and monitoring precision. Depending on the particular application of the input device 1, the sampling rate may be a relatively low frequency, such as 25 Hz, or a relatively high frequency, such as 5 kHz.

The observed localised variables, in this case, the generated charges detected by the controller 10, can be used to determine a data matrix $M_{ij}$ which reflects the complex deformation applied to the overall device 1 and the network of the sensing elements 12a-12i therein. Successive readings can provide a series of matrices $M_{ij}(t)$, through which the localised deformations can be used to reconstruct features of the motion or gesture of the finger 5.

In addition, the input device 1 can be controlled by the user pressing a specified portion of the sleeve 2. For instance, if the user presses onto one side of the sleeve 2 using a finger of another hand, this would cause a distinctive pattern of stretching and compression in the surrounding sensing elements 12a-12i.

Figure 5:
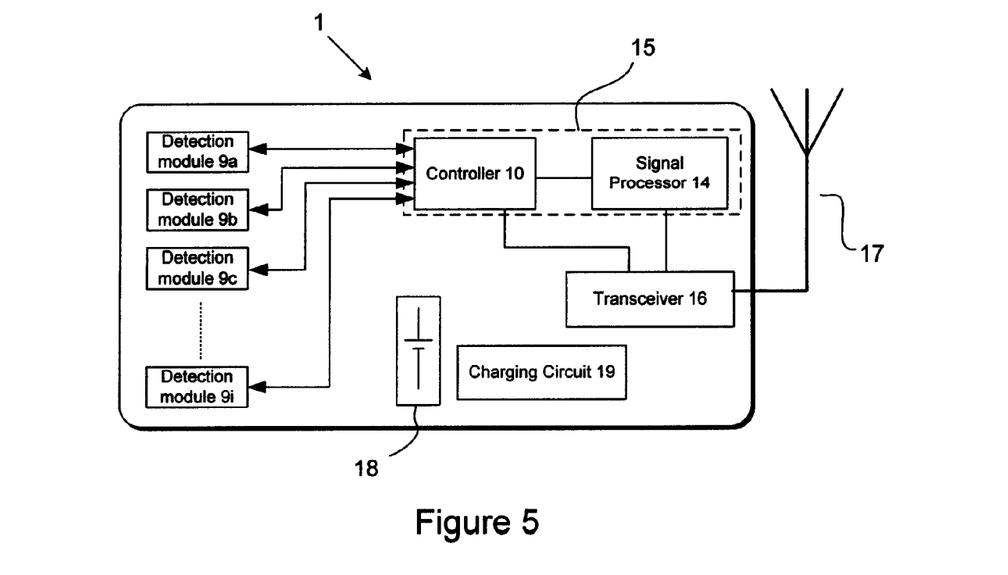

As shown in FIG. 5, the input device 1 also comprises a signal processor 14 for generating an output signal according to the readings obtained from the sensing elements 12a-12i.

In this particular example, a microprocessor 15 is configured to act as the controller 10 and the signal processor 14. The microprocessor 15 may also be arranged to perform functions associated with establishment of the wireless communications link 6.

The input device 1 also comprises a transceiver 16 and antenna 17 for transmitting and receiving signals via the wireless communications link 6.

In some embodiments of the invention, the input device 1 may be arranged to provide active feedback to a user by applying pressure or vibrations to the user's skin. In such a case, the controller 10 may generate a control signal or, where provided, the antenna 17 and transceiver 16 may be arranged to receive a control signal from the external device 2. The controller 10 may then cause the exertion of pressure or, where pressure is applied repeatedly, vibrations in accordance with the control signal. Such active feedback may be applied in response to an alert generated by the controller 10 or by the external device 2 or simply to provide an acknowledgement of a command input through the input device 1.

In embodiments where the sensing elements 12a-12i comprise materials such as PZT or PVDF, the sensing elements 12a-12i can be used to provide active feedback. In other words, the sensing elements 12a-12i may be arranged to operate in two modes. In a first mode, a sensing element 12a acts as a sensor detecting flexural deformations, when exposed to mechanical deformation. Meanwhile, in a second mode, the sensing element 12a functions as an actuator for generating mechanical vibrations, in accordance with a signal supplied from the controller 10 via the conductors 7a-7c, 8a-8c.

The input device 1 may be arranged to transmit the output signals from the detection modules 9a-9i to the external device 2. In such a case, the external device 2 would be arranged to execute software to generate a command signal based on the received output signals and/or reconstruct the motion of the user. Alternatively, the microprocessor 15 may be arranged to process the output signals before their transmission, to reduce the amount of data transmitted between the input device 1 and external device 2. In either case, the software executed in the microprocessor 15 or external device 2 may be configured to generate a signal that depends, in whole or in part, on the degree of deformation of the skin, the type of deformation, the speed at which the deformation has taken place and/or a reconstruction of the movement of user. The speed at which the deformation has taken place and/or the movement reconstruction can be determined according to time derivatives of the detected deformations, obtained from the comparison of successive readings from the individual detection modules 9a-9i. The use of successive readings may improve the reliability and stability with which the output signal of the input device 1 corresponds to the user's movements.

The software of the external device 2 may be configured to allow a user to assign commands to various gestures and/or motions of the input device 1, in order to customise the use of the input device 1 according to their own preferences.

In this particular example, the input device is powered by a battery 18 that can be recharged using charging circuitry 19.

The density of detection modules 9a-9i may depend on the precision required by the application of the input device 1. The mesh-type arrangement of FIGS. 2, 3 and 4 is particularly advantageous in arrangements requiring a high precision, and, therefore, a high density of detection modules. However, other types of arrangement can be used in place of the mesh.

Figure 6:
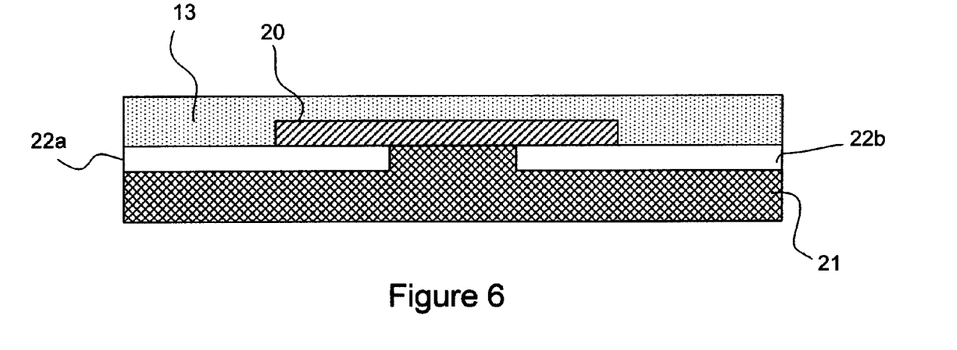
FIGS. 6, 7 and 8 are cross-sectional views of input devices according to second, third and fourth embodiments of the invention.
Figure 7:
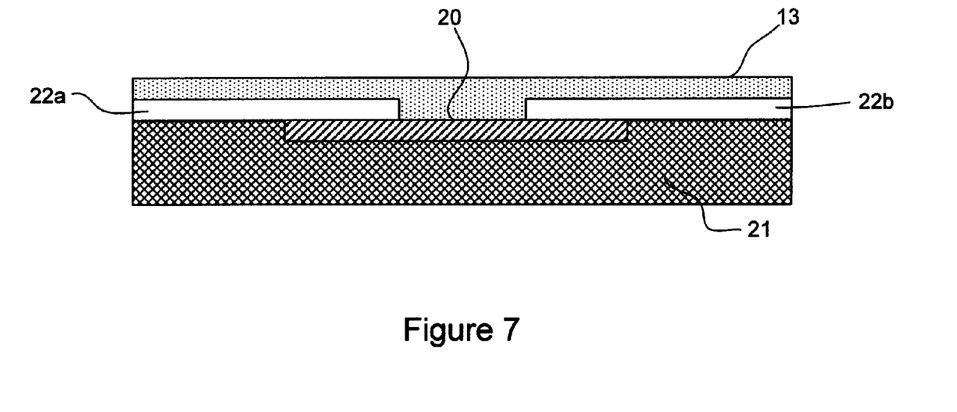
Figure 8:
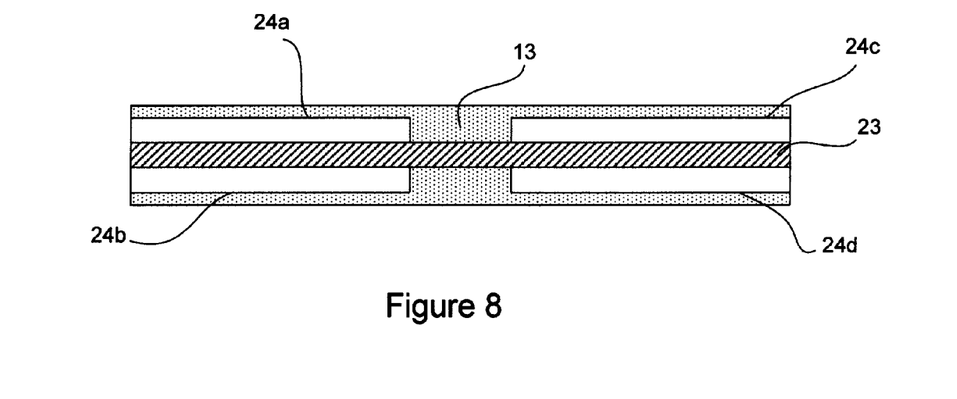

Cross-sections of alternative sensing arrangements are shown in FIGS. 6, 7 and 8. In a second embodiment of the invention, an input device corresponding to the block diagram of FIG. 5 may be provided with an alternative arrangement of detection modules. As shown in FIG. 6, the input device comprises detection modules in the form of sensing elements 20, provided on a substrate 21. One such sensing element 20 is depicted in FIG. 6. The sensing elements 20 are directly deposited or mounted on the substrate 21, in which elastic conductors 22a, 22b are embedded. The conductors 22a, 22b are connected to the sensing element 20 on opposite sides of one of its surfaces.

As in the previous embodiment, the sensing elements 20 are configured respond to stretching and/or flexing by generating a charge or changing an electric property, such as resistance or capacitance. Elastic conductors 22a, 22b, are connected from opposite edges on the same side of the sensing element 20. The electronic components of the input device are covered in an encapsulation material 13 to form a sleeve.

Suitable materials for forming the sensing elements 20, conductors 22a, 22b and encapsulation material 13 are discussed above, in relation to the sensing elements 12a-12i, conductors 7a-7c, 8a-8c and encapsulation material 13 of the input device 1 of the first embodiment. As before, the sensing elements 20 may be portions of the encapsulation material 13 that forms the sleeve. The substrate 21 may be formed of an elastic material such as an elastomer, silicone, acrylic or polyurethane.

FIG. 7 depicts part of an input device according to a third embodiment of the invention, which differs from the input device of FIG. 6 by way of the integration of the sensing elements 20. In the input device of FIG. 7, the sensing elements 20 are embedded in the substrate 21, so that the elastic conductors 22a, 22b overlie the sensing elements 20a, 20b.

FIG. 8 depicts an input device according to a fourth embodiment of the invention, which comprises yet another alternative sensor arrangement. The input device of the fourth embodiment otherwise corresponds to the block diagram of FIG. 5.

In the input device of FIG. 8, sensing elements 23 are provided in the form of multiple segments of a layer of sensing material. However, in yet another embodiment of the invention, a sensing element may be provided that extends across the sleeve in a continuous layer.

Elastic conductors 24a-24d are arranged on either side of the sensing elements 23. The sensing elements 23 and conductors 24a-24d are covered in encapsulation material 13. Suitable materials for the sensing elements 23, conductors 24a-24d and encapsulation material 13 were described above, in relation to the sensing elements 12a-12i, conductors 7a-7c, 8a-8c and encapsulation material 13 of the input device 1 of the first embodiment.

The arrangement of FIG. 8 permits stretching and flexing to be monitored by combining readings based on different pairs of conductors 24a-24d. For instance, pairs of the conductors 24a-24c and/or 24b-24d can be used to measure in-plane stretching. Meanwhile, crossed pairs of conductors, such as pairs 24a & 24d and/or 24b & 24c can be used to measure out-of-plane deformation, that is, flexure. The readings may be obtained using a similar readout architecture to that shown in FIG. 3, with appropriate provision for taking multiple measurements based on the different conductor pairs.

In each of the embodiments shown in FIGS. 2 to 4, 6, 7 and 8, the conductors 22a, 22b are configured so that changes in their resistances when stretched are limited, minimal or even negligible. This ensures stable operation of the input device 1. Moreover, the sensing elements 20, 23 are not screened when the overall device is stretched and/or flexed.

Although the first to fourth embodiments have been described in relation to an input device that monitors the deformation of skin around the joint 4 of an index finger 5, other embodiments may be devised in which the input device is configured to placed around another joint instead of, or in addition to, the joint 4 of an index finger 5. Such joints include other joints of the index finger, the joints of other fingers, wrists, knees, toes and elbows.

Figure 9:
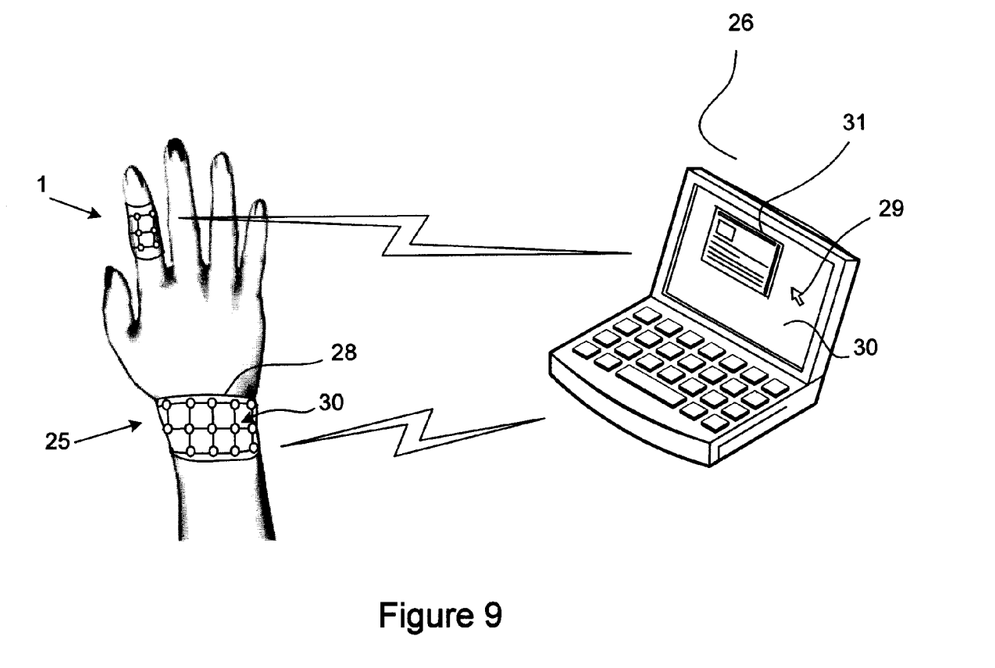
FIG. 9 depicts the use of the input device of FIG. 1 with another input device according to a fifth embodiment of the invention to control a computer.

If required, a system may be configured so that an external device 2 receives signals from more than one input device and combines the received signals, using software, to generate a command or control signal accordingly. For example, FIG. 9 shows an arrangement in which the input device of FIG. 1 is used in combination with a input device 25 to control a laptop computer 26. The input device 25 of FIG. 9 is similar to the input device 1 of FIG. 1a and may be configured with any of the sensor arrangements of the first to fourth embodiments or a suitable alternative sensor arrangement. However, the sleeve 28 has dimensions permitting it to fit around a user's wrist. In addition, in this particular example, the input device 25 is equipped with a larger number of detection modules 30 than the input device of FIG. 1a.

The combination of the input device 1 with the wrist mounted input device 25 permits tracking of the motions that would normally be used to operate a mouse. A user can then move their wrist to cause a cursor 29 to move around the screen 30 of the laptop computer 26, for example, for browsing displayed content 31, and move their finger 4 to select or execute an item displayed on the computer screen 30, without requiring the provision of a mouse or touch keypad on the laptop.

In this manner, input devices 1, 25 according to embodiments of the invention may improve the portability of equipment such as laptop computers, PDAs and so on. Such input devices may also improve the usability of near-eye displays (NEDs), by providing a user interface that is comfortable and intuitive to use, which can allow the browsing of information without detriment to the user's privacy.

Additionally, one or both of the input devices 1, 25 may be arranged to serve as active alerting device in connection with the laptop computer 26 and digital content services therein. For instance, an alert signal might be wirelessly received by one or both input devices 1, 25 from the laptop computer 26 and initiate squeezing of the device 32 around the wrist of the user, or the application of pressure or vibrations to the skin, in the manner described hereinabove. Such an alert could be used to inform a user to the status of a process, such the arrival of a new message via SMS or e-mail arrival. The squeezing of the input device 1, 25 or the application of pressure/vibrations may be performed with different frequencies and with predefined pulsed structures associated to particular digital service. Frequency and intensity of squeezing, pressure or vibration may be correlated to importance of the new arrived message.

Figure 10:
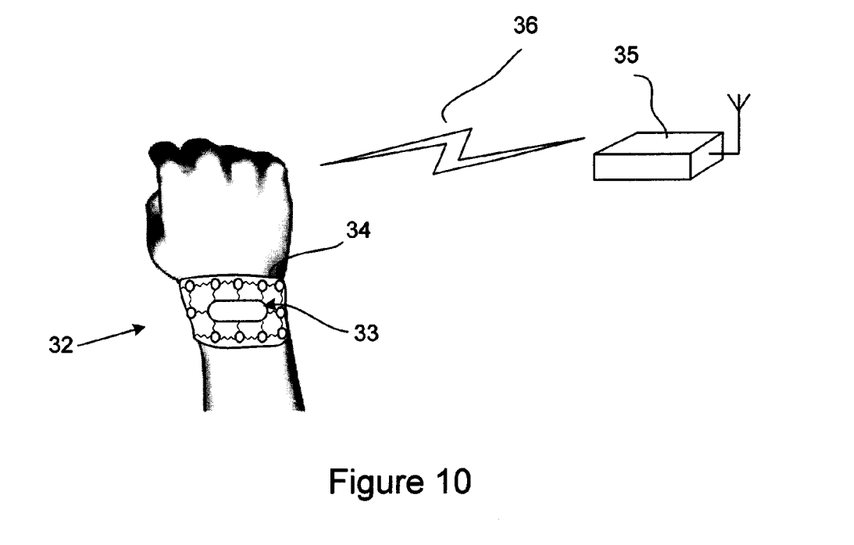
FIG. 10 depicts an input device comprising an integrated device, according to a sixth embodiment of the invention.
Figure 11A:
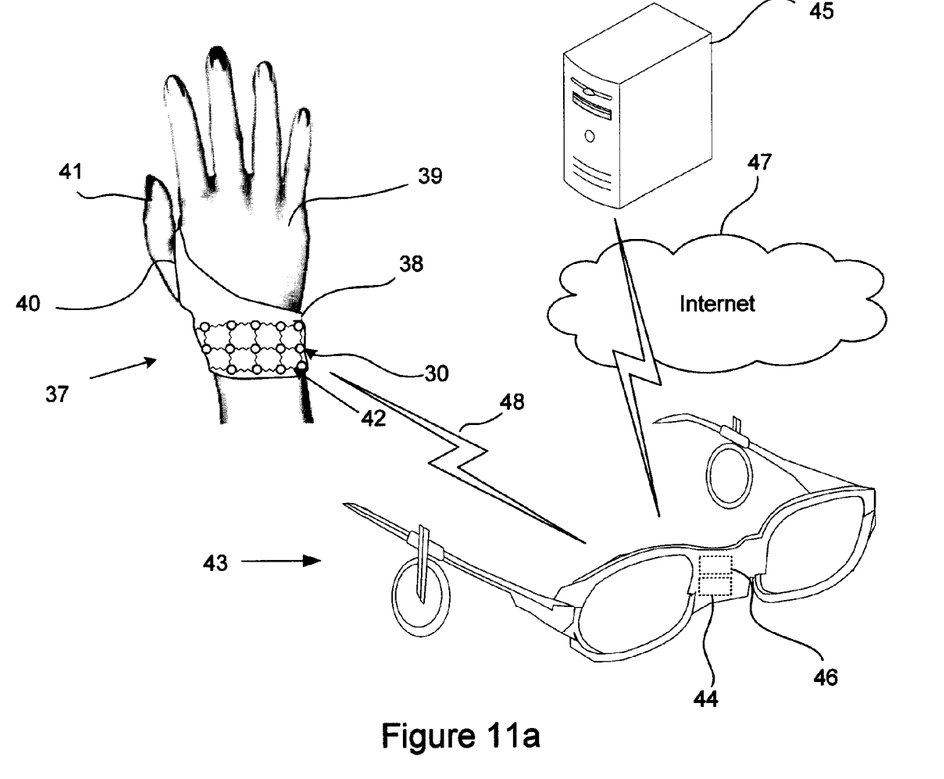
FIG. 11a depicts an input device according to a seventh embodiment of the invention, arranged to control a near-eye display apparatus, when in a first position.

Examples of other embodiments to be placed around a user's wrist are shown in FIGS. 10 and 11a. Each of the input devices 32, 33 of FIGS. 10 and 11a may be configured with sensor arrangements according to any one of FIG. 2 to 4, 6, 7 or 8 or a suitable alternative sensor arrangement.

The positioning of an input device 25, 32, 33 on a user's wrist permits the user to exert control over another device without necessarily limiting movement of their hands or fingers. In addition, such a position may be less uncomfortable for a user, as they may be accustomed to wearing a wristwatch around their wrist.

Unlike the previously described embodiments, the input device 32 of FIG. 10 is arranged to control a second device 33 that is built into the same sleeve 34. The second device 33 may be integrated with the electronic components of the input device 32. In this example, communication between the input device 32 and second device 33 is performed via a wired connection, however communication between the second device 33 and another device 35 can be conducted over a wireless communications link 36. In such a case, the device 33 may be equipped with a transmitter and/or receiver, or with a transceiver. The other device 35 may be a device such as a mobile telephone, a telephone headset and so on. The second device 33 may comprise a personal audio player, FM radio receiver, GPS receiver or digital watch built into the sleeve 34, with components for communicating with another device 35 being provided where appropriate. By performing predetermined movements, the user can control the device 33 to perform functions such as accepting/rejecting an incoming phone call, browsing through received messages, switching the second device 33 on or off, adjusting volume, changing a song, tuning to a radio station, and so on, depending on the functionality of the second device 33.

As discussed above in relation to FIG. 9, the input device 32 may be arranged to serve as active alerting device in response to alert signals received from an external device 35. Where the second device 33 comprises a GPS receiver and the external device 35 processes and/or determines location information relating to the user obtained from the second device 33, such an alert mechanism may be used to inform the user of their proximity to a predefined location, such as a shop or landmark.

The input device 37 of FIG. 11a is similar to that of FIG. 9. However, in this particular embodiment, the sleeve 38 is configured to extend over part of the user's hand 39. In this example, an aperture 40 is provided for a thumb 41 of the user to pass through, to assist in maintaining the position of the input device 37 on the user's wrist.

In FIG. 11a, the input device 37 shown controlling the display of an image on a NED 43. The NED 43 is equipped with a receiver 44 for receiving TV signals or other audio visual data signals, for instance, from a computer 45. Alternatively, or additionally, the NED 43 may include a processor 46 for generating images according to received data signals. For instance, the NED 43 arranged to display images based on web page data received from the computer 45, directly or via the Internet 47, to provide a web-browser application, access to e-mails and/or access to remote data storage. The input device 37 may be arranged to communicate directly with a processor 46 within the NED 43, via a wired or wireless connection 48.

Figure 11B:
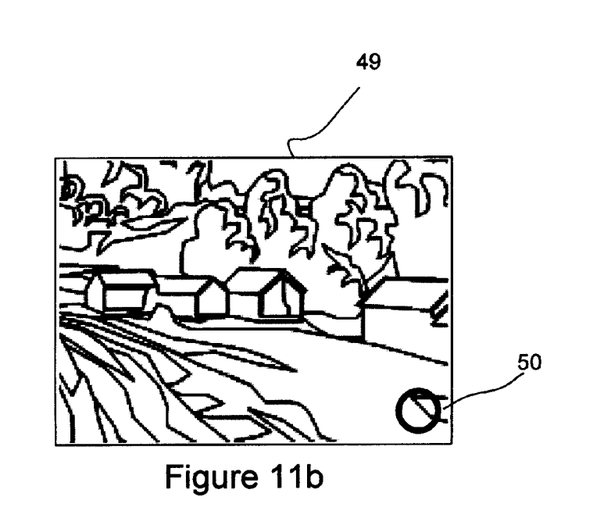
FIG. 11b depicts an image displayed by the near-eye display apparatus of FIG. 11a when the input device is in the first position.
Figure 12A:
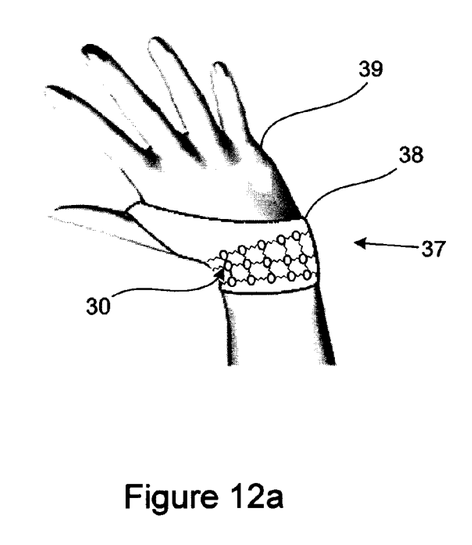
FIG. 12a depicts the input device of FIG. 11a, when in a second position.
Figure 12B:
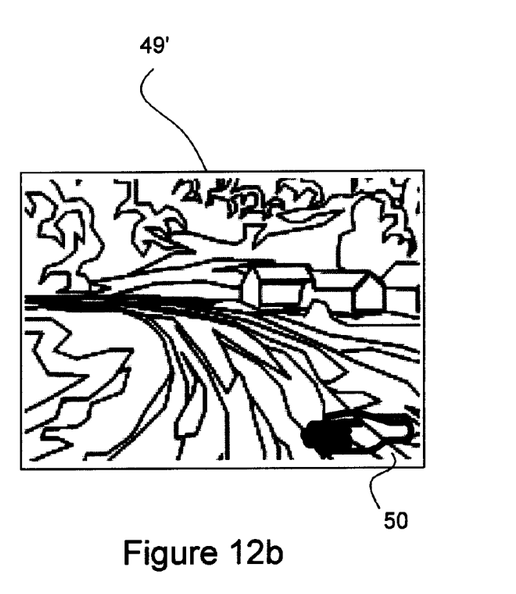
FIG. 12b depicts an image displayed by the near-eye display apparatus of FIG. 11a when the input device is in the second position.
Figure 13A:
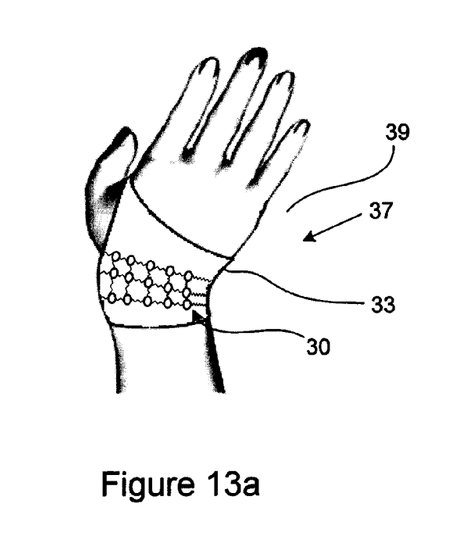
FIG. 13a depicts the input device of FIG. 11a, when in a third position.
Figure 13B:
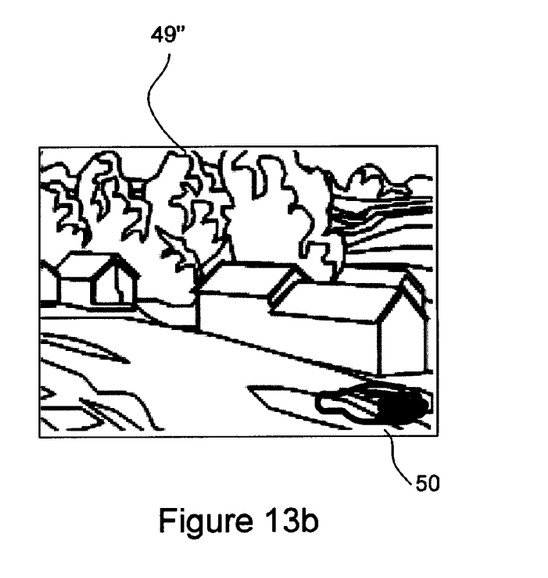
FIG. 13b depicts an image displayed by the near-eye display apparatus of FIG. 11a when the input device is in the third position.
Figure 14A:
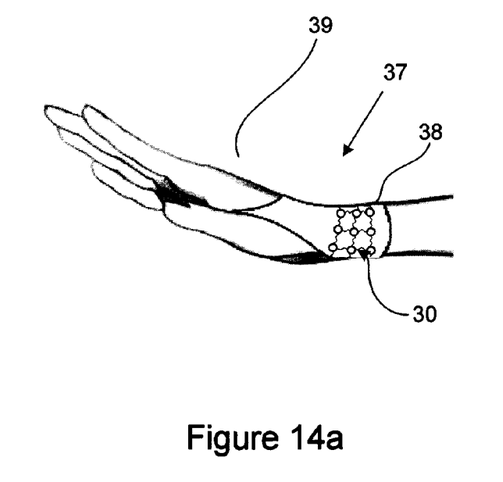
FIG. 14a depicts the input device of FIG. 11a, when in a fourth position.
Figure 14B:
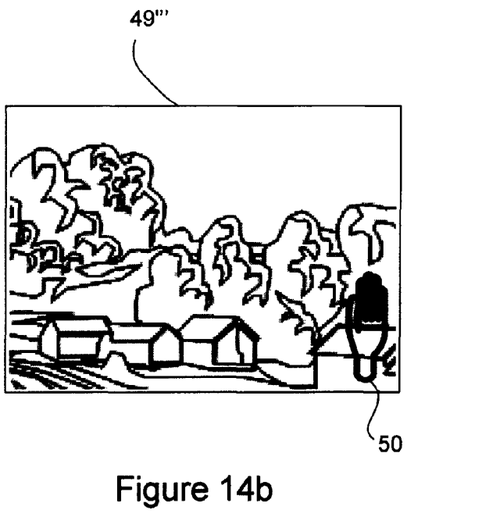
FIG. 14b depicts an image displayed by the near-eye display apparatus of FIG. 11a when the input device is in the fourth position.
Figure 15A:
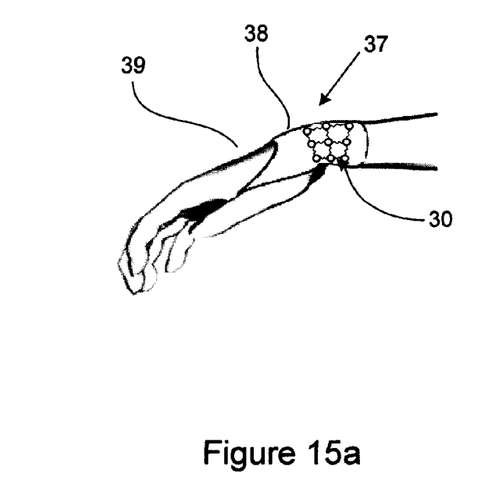
FIG. 15a depicts the input device of FIG. 11a, when in a fifth position.
Figure 15B:
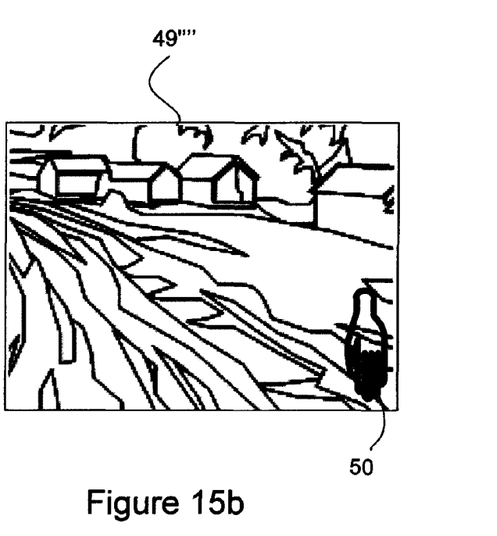
FIG. 15b depicts an image displayed by the near-eye display apparatus of FIG. 11a when the input device is in the fifth position.

FIG. 11a depicts the input device 37 when the hand 39 of the user is in a rest position, while FIG. 11b depicts an example of an image 49 displayed by the NED 43 when it is determined that the user's hand 39 is in that position. An indicator 50, corresponding to the motion, position or gesture of the user's hand 39, is superimposed over the image 49. The indicator 50 may taken the form of a virtual projection of the user's hand 39, an icon, a pointer, and so on. In this particular example, the indicator 50 is a semi-transparent icon, so that the underlying image 49 is not obscured. Since both the image 49 and the indicator 50 are displayed in the user's visual field, it is relatively easy for the user to guide, navigate and browse digital content using dedicated hand movements, without requiring the user to touch, or otherwise physically interact with, the NED 43. Since the image 49 and other content can be displayed and browsed effectively using on the NED 43, the user can view data with privately, even in public places, for example, when using public transport, in a public building or in a street.

FIGS. 12a, 13a, 14a and 15a depict the input device 37 is moved left, right, up and down respectively, causing stretching and/or flexing of the detection modules 30. In this particular example, the NED 43 is displaying an image. FIGS. 11b, 12b, 13b, 14b and 15b depict the image 49, 49', 49", 49"', 49"" and indicator 50, perceived by the user when viewing the NED 43 following the making of the gesture shown in FIGS. 11a, 12a, 13a, 14a and 15a respectively. In this particular example, the user can pan across an image in various directions by moving their hand 39 accordingly. In a similar manner, the input device 37 could be used to control a cursor in order to browse content and/or select items from a menu displayed on the NED 43.

FIGS. 12a, 13a, 14a and 15a demonstrate that the input device 27 can be used to generate command signals using a considerable number of gestures, such as moving the hand left, right, up or down. Alternatively, or additionally, a wrist-mounted input device may be arranged to generate control signals based on other gestures, such as turning the hand in various directions and/or rotating the hand clockwise or anti-clockwise.

Although the input devices 1, 25, 32, 37 of the above described embodiments comprise elastic sleeves 3, 28, 34, 38, input devices according to other embodiments of the invention may instead be provided on a stretchable sticker for temporary adhesion to a user's skin, as an "electronic plaster" or on a bandage, to provide a "smart bandage". Such an arrangement may be suitable for monitoring deformation of parts of a body for medical or veterinary purposes, such as patient recovery monitoring.

In the specific embodiments described hereinabove, the input devices 1, 25, 37 provide interfaces for a PDA or tablet pc 2, a laptop computer 26 or NED 43, while the input device 32 of FIG. 10 was described as an interface for a number of electronic devices mounted on the sleeve 33, or integrated with, the input device 32. However, input devices according to embodiments of the invention may be used to control other external devices, including mobile telephones, audio-visual equipment and so on, or other devices mounted on, or integrated with, the input device, such as exercise monitors, a device for browsing through public information billboards, and so on.

Figure 16:
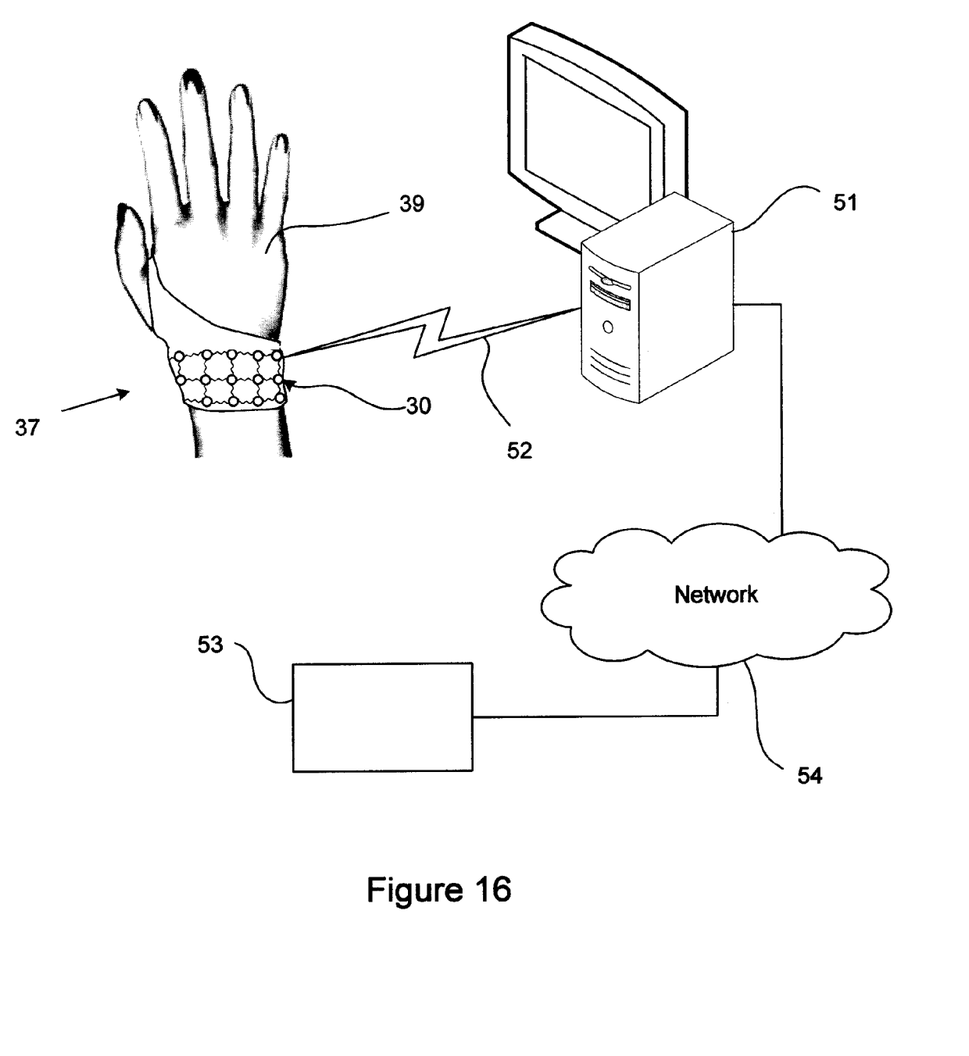
FIG. 16 depicts the input device of FIG. 11a when used in a robotic application.

Moreover, in some systems, such input devices may instead be used to track a user's movements. For instance, in an application where a user's hand movements are copied by a robotic apparatus to provide remote guidance and steering. FIG. 16 depicts the input device 37 of FIG. 11a when used in such an application.

In the example shown in FIG. 16, the input device 37 generates a signal based on the movement of the user's hand 39 as described previously. In this particular example, the outputs from the sensors 30 are transmitted to a computer 51 via a wireless link 52. The computer 51 is arranged to reconstruct the movement of the user's hand 39 based on said outputs. The computer 51 then generates a corresponding control signal for transmission to a device 53 arranged to replicate the movement of the user, via a network 54. As the deformation of the skin of the user and, thus, the movement of the user's hand 39 can be mapped and monitored with high precision by the input device 37, such a system may be particularly suitable for teleoperation of a device 53 in applications requiring delicate movements.

The invention claimed is:

1. An apparatus comprising:
a conformable material configured to, when placed adjacent to the skin of a user, undergo deformation conforming to deformation of the skin;
at least one of a plurality of sensors configured to provide respective outputs corresponding to the movement of said sensors with respect to one another in response to said deformation of the skin, wherein said sensors comprise sensing material configured to respond to deformation by generating an electrical charge; and
a controller connected to said sensors by conductors and configured to monitor charges generated by said sensing material.

2. An apparatus according to claim 1, wherein said sensors comprise sensing material that responds to deformation by altering at least one electrical property thereof, said apparatus comprises a controller connected to said sensors by conductors and configured to monitor changes in said electrical property.

3. An apparatus according to claim 1, wherein at least one of said sensors comprise a layer of said sensing material, said controller is connected to said at least one sensor by four of said conductors, a first and second of said conductors being connected to a first surface of said layer and a third and fourth of said conductors being connected to a second surface of said layer opposite to said first surface, said controller being configured to obtain readings from said sensor opposite surfaces of said layer and configured to perform said monitoring by taking readings using multiple pairs of conductors selected from said first, second, third and fourth conductors.

4. An apparatus according to claim 2, wherein at least one of said sensors comprise a layer of said sensing material, the controller is connected to said at least one sensor by four of said conductors, a first and second of said conductors being connected to a first surface of said layer and a third and fourth of said conductors being connected to a second surface of said layer opposite to said first surface, said controller being configured to obtain readings from said sensor opposite surfaces of said layer and configured to perform said monitoring by taking readings using multiple pairs of conductors selected from said first, second, third and fourth conductors.

5. An apparatus according to claim 1, comprising active feedback elements configured to exert pressure on said skin in response to at least one of said outputs and external wireless inputs.

6. An apparatus according to claim 5, wherein said sensors comprise said active feedback elements.

7. An apparatus according to claim 1, comprising a processor configured to generate at least one signal to control a device according to said outputs.

8. A system comprising:
at least one apparatus according to claim 7; and
said device.

9. A system according to claim 8, wherein said device is configured to determine a reconstruction of a movement of the user according to said outputs.

10. A system according to claim 8, wherein said device is configured to track movements of part of a body of the user according to the outputs of said sensors.

11. A system according to claim 8, wherein said device is configured to display content and said apparatus is configured to control browsing of said content.

12. A system according to claim 8, wherein said device is configured to display an image and to update said image periodically to correspond with said outputs.

13. A method comprising:
providing a plurality of sensors integrated on a conformable material, the sensors being configured to provide respective outputs corresponding to movement of said sensors with respect to one another;
generating an electrical charge by sensing material of one or more of the plurality of sensors in response to deformation of the conformable material; and
monitoring deformation of the conformable material including monitoring charges generated by the sensing material, said deformations conforming to deformation of skin of a user to which the conformable material is adjacent, using said sensors.

14. A method according to claim 13, wherein said monitoring comprises monitoring deformation of the sensing material within at least one of said sensors along multiple directions.

15. A method according to claim 13, comprising generating a signal to control a device according to said outputs.

16. A method according to claim 15, comprising:
providing a second apparatus, comprising a plurality of second sensors mounted on conformable material, the second sensors being configured to provide respective outputs corresponding to movement of said second sensors with respect to one another;
monitoring deformation of the conformable material, said deformations conforming to deformation of the skin of the user, using said second sensors; and
transmitting a second signal corresponding to said outputs to said device.

17. A system comprising:
a near eye display configured to display an image; and
an input device comprising conformable material configured to, when placed adjacent to a user's skin, undergo deformation conforming to deformation of the skin, a plurality of sensors comprising sensing material that responds to deformation by altering at least one electrical property thereof and configured to provide respective outputs corresponding to movement of said sensors with respect to one another in response to said deformation of the skin, a processor connected to said sensors by conductors and configured to monitor changes in said electrical property and generate a signal to control the display of the image by said near eye display according to said outputs and a transmitter configured to transmit the signal to the near eye display.

18. A system comprising:
a computing device configured to generate an image for display; and
at least one input device comprising conformable material configured to, when placed adjacent to a user's skin, undergo deformation conforming to deformation of the skin, a plurality of sensors comprising sensing material configured to respond to deformation by generating an electrical charge and configured to provide respective outputs corresponding to movement of said sensors with respect to one another in response to said deformation of the skin, a processor connected to said sensors by conductors and configured to monitor charges generated by said sensing material and generate a signal to control the display of said image according to said outputs and a transmitter configured to convey said signal to said computing device.

19. A system comprising:
a mobile telephone; and
an input device comprising conformable material configured to, when placed adjacent to a user's skin, undergo deformation conforming to deformation of the skin, a plurality of sensors comprising sensing material that responds to deformation by altering at least one electrical property thereof and configured to provide respective outputs corresponding to movement of said sensors with respect to one another in response to said deformation of the skin, a processor connected to said sensors by conductors and configured to monitor changes in said electrical property and generate a signal to control said mobile telephone according to said outputs and a transmitter configured to transmit the signal to the mobile telephone.

* * * * *